United States Patent [19]

Sirrenberg

[11] 3,862,276

[45] Jan. 21, 1975

[54] PREPARATION OF 0-(2,2-DICHLOROVINYL)-THIONOPHOSPHORIC ACID ESTER DICHLORIDE

[75] Inventor: Wilhelm Sirrenberg, Sprockhoevel, Germany

[73] Assignee: Bayer Aktiengesellschaft, Leverkusen, Germany

[22] Filed: Aug. 8, 1973

[21] Appl. No.: 386,682

Related U.S. Application Data

[62] Division of Ser. No. 267,746, June 30, 1972, abandoned.

[30] Foreign Application Priority Data

July 3, 1971    Germany............................ 2133198

[52] U.S. Cl................................. 260/985, 260/957
[51] Int. Cl. ............................................. C07f 9/20
[58] Field of Search .................................... 260/985

[56] References Cited
UNITED STATES PATENTS 3,642,960   2/1972   Pitt et al. ............................ 260/985
3,701,818   10/1972  Soloway et al.................. 260/985 X

*Primary Examiner*—Lorraine A. Weinberger
*Assistant Examiner*—Richard L. Raymond
*Attorney, Agent, or Firm*—Burgess, Dinklage & Sprung

[57] ABSTRACT

0-(2,2-dichlorovinyl)-thionophosphoric acid ester dichloride is synthesized in high yield by reacting 0-(2,2-dichlorovinyl)-phosphoric acid ester dichloride with phosphorus pentasulfide in the presence of phosphorus sulfochloride as solvent and at a temperature of about 110° to 160°C. The new compound can be reacted with alcohols and/or amines to give known products which are pesticidal, e.g., insecticidal, acaricidal and nematodical.

5 Claims, No Drawings

PREPARATION OF O-(2,2-DICHLOROVINYL)-THIONOPHOSPHORIC ACID ESTER DICHLORIDE

This is a division, of application Ser. No. 267,746, filed June 30, 1972, now abandoned.

The present invention relates to the new compound O-(2,2-dichlorovinyl)-thionophosphoric acid ester dichloride, which can be used as a starting material for the synthesis of highly effective pesticidal, in particular insecticidal, acaracidal and nematocidal, substances and to a process for its production.

It is known from N. N. Godovikov and M. I. Kabachnik, Z.obsh. Chim. 31, 1628 (1961) that when O-arylphosphoric acid ester dichlorides are heated with phosphorus pentasulfide to 140° to 150°C, the semipolarly bonded oxygen is exchanged for sulfur, with the formation of O-arylthionophosphoric acid ester dichlorides, the yields being between 45 and 65 percent of the theory.

The present invention provides the new compound O-(2,2-dichlorovinyl)-thionophosphoric acid ester dichloride of the formula

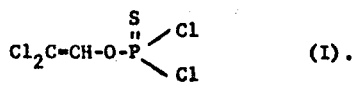

The present invention also provides a process for the production of O-(2,2-dichlorovinyl)-thionophosphoric acid ester dichloride in which phosphorus pentasulfide is reacted with O-(2,2-dichlorovinyl)-phosphoric acid ester dichloride at a temperature of about 110° to 160°C in the presence of a solvent, preferably phosphorus sulfochloride.

It is decidedly surprising that the process according to the invention leads in a smooth reaction to the desired O-(2,2-dichlorovinyl)-thionophosphoric acid ester dichloride of the formula (I) with the product being obtained in high purity and with yields of about 70 percent of the theory; this result could not have been predicted on the basis of the prior art. For it is known (see N. N. Godovikov and M. I. Kabachnik, Z. obsh. Chim. 31, 1628 (1961) and E. M. Popov and N. E. Medenikova, Z. obsh. Chim. 32, 3080 (1962)) that in the reaction of phosphorus pentasulfide with O-alkylphosphoric acid ester dichlorides, specifically with O-ethylphosphoric acid ester dichloride, at temperatures between 120° and 150°C, a mixture of products is formed which consists of O-ethylthiono-, S-ethylthiolo- and S-ethylthionothiol-phosphoric acid ester dichlorides. The formation of this mixture is caused by the ability of the O-ethylthionophosphoric acid ester dichloride to isomerize under the reaction conditions stated. The thiolo compound then reacts with further phosphorus pentasulfide to give the thionothiol derivative.

It is also known that the reaction proceeds autocatalytically and even traces of the thiolo compound, which are always formed, act as catalyst.

By reason of this prior art it would have been expected that the process according to the invention would not proceed in the desired manner. The process according to the invention therefore represents a unique preparative method for the reaction product of the formula (I).

The process according to the invention is distinguished, in particular, by its simple industrial operation.

The reaction course can be illustrated by the following equation:

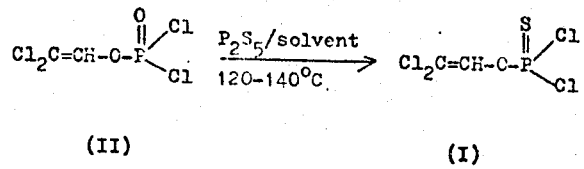

The starting material defined by the formula (II) is known from the literature.

Phosphorus sulfochloride is the preferred solvent or diluent. The reaction temperatures can be varied within a fairly wide range. In general, the work is carried out at about 110° to 160°C, preferably about 120° to 135°C.

For the carrying out of the process according to the invention, the phosphorus pentasulfide is added to the phosphoric acid ester dichloride present in the solvent or diluent, and the mixture is heated under reflux until the pentasulfide has completely dissolved. Preferably, 1 mole of phosphorus pentasulfide is used for 4 moles of phosphoric acid ester dichloride. An excess of phosphorus pentasulfide brings no advantages. Normally, a heating duration of about 0.5 to 2 hours suffices. Excessively long heating should be avoided since it leads to losses in yield. Subsequently, the reaction mixture is cooled, the solution is decanted from undissolved matter, the phosphorus sulfochloride is distilled off and the residue is distilled in a column.

The O-(2,2-dichlorovinyl)-thionophosphoric acid ester dichloride preparable according to the process serves for the preparation of new crop protection agents based on phosphoric acid esters. It is in this connection extremely valuable as an intermediate since, in a smooth reaction, not only phosphoric acid triesters can be obtained but, by conversion with alcohols and/or amines, also diester amides or ester diamides.

The process of this invention is illustrated in and by the following Example.

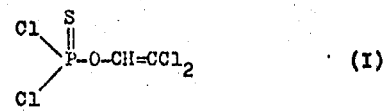

To a solution of 115 g of O-(2,2-dichlorovinyl)-phosphoric acid ester dichloride in 170 g of phosphorus sulfochloride there are added 33 g of phosphorus(V) sulfide and the mixture is heated to the boil under reflux. When the phosphorus(V) sulfide has dissolved (about one hour) the mixture is allowed to cool and the solution is decanted from undissolved matter. The phosphorus sulfochloride is evaporated off and the residue is distilled in a column. There are so obtained 84 g (68.3 percent of theory) of the desired O-(2,2-dichlorovinyl)-thionophosphoric acid ester dichloride of the boiling point 75°C/3 mm Hg and the refractive index $n_D^{20}$ 1.5490.

By refluxing with more than twice its molar amount of methanol or ethanol, the excess methanol and ethanol respectively serving as solvent, the novel compound forms, O,O-dimethyl- or O,O-diethyl-O-(2,2-dichlorvinyl)-thionophosphate which are active against insects, acarids and nematodes, e.g., grain weevils and the like, when sprayed in aqueous dispersion or organic solution.

It will be appreciated that the instant specification and examples are set forth by way of illustration and not limitation, and that various modifications and changes may be made without departing from the spirit and scope of the present invention.

What is claimed is:

1. A process for the preparation of O-(2,2-dichlorovinyl)-thionophosphoric acid ester dichloride of the formula

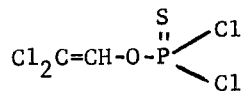

which comprises contacting phosphorus (V) sulfide with O-(2,2-dichlorovinyl)-phosphoric acid ester dichloride at a temperature of about 110°C to 160°C in the presence of phosphorus sulfochloride as solvent.

2. The process according to claim 1 in which the temperature is about 120° to 135°C.

3. The process according to claim 1 in which the molar ratio of phosphorus pentasulfide to O-(2,2-dichlorovinyl)-phosphoric acid ester dichloride is about 1:4.

4. The process according to claim 1 in which the mixture is heated for about 0.5 to 1.5 hours under reflux.

5. The process according to claim 1 in which the temperature is about 120° to 135°C, the molar ratio of phosphorus pentasulfide to O-(2,2-dichlorovinyl)-phosphoric acid ester dichloride is about 1:4, and the mixture is heated for about 0.5 to 1.5 hours under reflux.

* * * * *